(12) United States Patent
May et al.

(10) Patent No.: US 11,677,099 B2
(45) Date of Patent: Jun. 13, 2023

(54) STACKING SYSTEM AND METHOD FOR CONTINUOUSLY PILING CUTOUTS FROM AT LEAST ONE FOIL -OR MEMBRANE-LIKE MATERIAL WEB ONTO A STACK

(71) Applicant: Siemens Aktiengesellschaft, Munich (DE)

(72) Inventors: Torsten May, Bubenreuth (DE); Jonas Pils, Sr., Buckenhof (DE); Luciano Wolke Da Silva, Postbauer-Heng (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 137 days.

(21) Appl. No.: 17/216,797

(22) Filed: Mar. 30, 2021

(65) Prior Publication Data
US 2021/0305629 A1    Sep. 30, 2021

(30) Foreign Application Priority Data

Mar. 31, 2020 (EP) ................................ EP20167354

(51) Int. Cl.
*H01M 10/0585*  (2010.01)
*B65H 35/00*  (2006.01)
*H01M 4/04*  (2006.01)

(52) U.S. Cl.
CPC ...... *H01M 10/0585* (2013.01); *B65H 35/008* (2013.01); *H01M 4/0402* (2013.01)

(58) Field of Classification Search
CPC ............ H01M 4/0402; H01M 10/0585; B65H 35/008

USPC ........................................................ 429/209
See application file for complete search history.

(56) References Cited

U.S. PATENT DOCUMENTS

| 6,547,229 B1 | 4/2003 | Hanson et al. |
| 2013/0305524 A1 | 11/2013 | Hohenthanner et al. |
| 2018/0241054 A1* | 8/2018 | Bihlmaier ........... H01M 8/0286 |

FOREIGN PATENT DOCUMENTS

| CN | 103384935 | 11/2013 |
| CN | 108448150 | 8/2018 |
| CN | 110911631 | 3/2020 |
| DE | 102016007706 | 12/2017 |
| DE | 102018102642 | 8/2019 |
| JP | 2017-033752 | 2/2017 |
| WO | 0242191 | 5/2002 |

(Continued)

OTHER PUBLICATIONS

EP Search Report dated Oct. 15, 2020 based on EP20167354 filed Mar. 31, 2020.

*Primary Examiner* — James M Erwin
(74) *Attorney, Agent, or Firm* — Cozen O'Connor (57) ABSTRACT

Stacking system and method for continuously piling cutouts from at least one foil- or membrane-like material web onto a stack, wherein the at least one foil- or membrane-like material web is continuously fed, the at least one foil- or membrane-like material web is cut to a size dependent on the dimensions of the stack to form a blank, the blank is received by a magazine of a continuously moving, in particular rotating, transfer apparatus having a plurality of magazines, and where the received blank is transferred from the magazine onto the stack, before the magazine receives a subsequent blank.

22 Claims, 6 Drawing Sheets

(56) References Cited

FOREIGN PATENT DOCUMENTS

| WO | 2012084180 | 6/2012 |
| WO | 2019048589 | 3/2019 |
| WO | WO 2019/154814 | 8/2019 |

* cited by examiner

STACKING SYSTEM AND METHOD FOR CONTINUOUSLY PILING CUTOUTS FROM AT LEAST ONE FOIL -OR MEMBRANE-LIKE MATERIAL WEB ONTO A STACK

BACKGROUND OF THE INVENTION

1. Field of the Invention

The invention relates to a method and to a stacking system for continuously stacking blanks of at least one foil- or membrane-like material web onto a stack.

2. Description of the Related Art

In the search for alternatives to conventional internal combustion engines in the automotive industry, batteries are the focus of research and development. An efficient way of producing batteries is essential for the widespread use of electric motors as a drive source in the transportation and logistics sector. Different methods are employed for producing a battery cell depending on the type of battery. Amongst other things, the format of the battery cells in question is important here. For example, stacking methods are used for pouch cells, for example, where a separator, an anode, a separator and a cathode are alternately placed one on the other. Stacking is generally performed sequentially and via "pick-and-place" methods. As a result, the dynamics are limited on account of the mass inertia of actuators involved, such as robot arms, which perform the gripping and transfer movement. Therefore, stacking, which is a high-quality method for forming cell stacks at the same time, constitutes a bottleneck during the manufacture of batteries.

Cylindrical or prismatic winding, which allows higher production rates than stacking, constitutes an alternative manufacturing method. However, only a limited energy density in the battery cells or battery modules can be achieved with this cylindrical or prismatic winding, and therefore conventional winding is generally ruled out as a production method.

In addition, damage to the sensitive foils, which are used for battery cells, is disadvantageously easily possible in the case of prismatic winding processes. Damage can be caused primarily by narrow radii during winding, and therefore a prismatically wound cell can potentially become very hot or could catch fire during the aging process.

With "Z-folding" methods, separator foils can be folded, for example, with the aid of grippers, and therefore a stack can roughly be formed. Here, electrode material is applied to different sides of the separator foil in advance.

The same challenges are faced in the production of fuel cells. Here, there is also an increased requirement for efficient manufacturing methods owing to the high demand for alternative drive sources. Pick-and-place methods for stacking bipolar plates and membranes situated between them also slow down the production rate in the production of fuel cells.

SUMMARY OF THE INVENTION

In view of the foregoing, it is an object of the present invention to provide an improved manufacturing method for batteries and fuel cells.

This and other objects and advantages are achieved in accordance with the invention by a method for continuously stacking blanks of at least one foil- or membrane-like material web onto a stack, where at least one foil- or membrane-like material web is continuously fed, the at least one foil- or membrane-like material web is cut to a size dependent on the dimensions of the stack to form a blank, the blank is received by a magazine of a continuously moving, in particular rotating, transfer apparatus having a plurality of magazines, and where the received blank is transferred from the magazine onto the stack, before the magazine receives a subsequent blank.

The method in accordance with the invention advantageously combines the advantages of the stacking technique for the manufacture of battery cells in comparison to the prismatic winding technique with the advantages of continuous feeding in comparison to the discontinuous pick-and-place movements. Similarly, the stacking technique is advantageously combined with continuous feeding for the manufacture of fuel cells.

On account of using the transfer apparatus having a plurality of magazines and receiving cut-to-size parts of the material web in separate magazines, the blanks, which form the stack for a battery cell or a fuel cell, are continuously stacked. High manufacturing rates are advantageously achieved in this way. At the same time, high-quality battery cells and battery modules, which in particular are not damaged by winding or Z-folding methods, can be manufactured. The gripping processes, which are required in a pick-and-place method, can advantageously also be dispensed with.

Stacking of membranes and bipolar plates via the transfer apparatus for producing fuel cells is advantageously accelerated in comparison to a pick-and-place method for all layers to be stacked.

The transfer apparatus moves continuously and, in the process, can move, for example, at a variable speed. For example, the transfer apparatus rotates continuously at a variable or constant rotation speed.

For example, a magazine is responsible for receiving a blank for each movement cycle. For example, during one revolution of the transfer apparatus, a magazine receives a blank at a first point or at a first time and transfers this blank at a second point or at a second time onto the stack, such as by placing it onto the stack. On account of further rotation of the transfer apparatus, the magazine again arrives at the first point and can receive a subsequent blank at a next time.

The magazine is configured to receive the blank and also to subsequently transfer the blank onto the stack. The rate of supply of the material web can be adjusted depending on the number of magazines provided in the transfer apparatus. The more magazines provided, then the faster the conveying by the unwinding or deflection roller can occur, for example.

In accordance with an embodiment, the at least one foil- or membrane-like material web is fed via an unwinding or deflection roller.

In accordance with another embodiment, the at least one foil- or membrane-like material web is configured as a separator foil or an electrode foil for a battery cell. Therefore, different magazines of the transfer apparatus can advantageously be fitted with electrode foil blanks and separator foil blanks, so that electrode foil blanks and separator foil blanks can be placed onto the stack alternately.

In accordance with a further embodiment, the at least one foil- or membrane-like material web is formed as a membrane for a fuel cell. In the case of fuel cells, bipolar plates are produced, for example, via hydroforming and these are then stacked, for example, alternately with a membrane layer.

In accordance with yet another embodiment, a plurality of foil- or membrane-like material webs are fed and cut to size as a common blank. For example, electrodes and separator foils are supported one above the other in a prior method step such that the layered material web that is formed constitutes the starting base for blanks that can be stacked by cutting the material web to size. Therefore, a combination of an electrode foil and a separator foil, particularly consisting of an anode layer, a separator layer, a cathode layer and a further separator layer, which combination is received in the magazine, is already continuously fed.

In accordance with another embodiment, a plurality of common blanks cut-to-size consecutively are received in respective magazines of the transfer apparatus and are transferred to the stack consecutively. On account of the transfer apparatus, the cut-to-size individual layer packages are stacked one above the other and form a battery cell on the stack owing to continuous execution of the above-described steps.

In accordance with a still further embodiment, a plurality of foil- or membrane-like material webs are fed and are cut to size as respective separate blanks. For example, each cutting-to-size operation is performed at a suitable point in front of the magazine. For reasons of space, the cutting-to-size operation can be performed, for example, at a different distance from the respective register.

In accordance with a further embodiment, the respective blanks are received in respective magazines of the transfer apparatus and are transferred onto the stack consecutively. Therefore, both layer packages already formed in advance and also individual layers of a battery cell can be transferred onto the stack by one or more fed material webs in the various magazines of the transfer apparatus and therefore form the battery cell.

In accordance with yet a further embodiment, in each case one foil- or membrane-like material web is continuously conveyed by a respective one of a plurality of unwinding or deflection rollers. Depending on restrictions to the unwinding rate, a plurality of magazines can advantageously be filled at the same time owing to the use of a plurality of unwinding or deflection rollers and a higher processing rate can be achieved as a result. For example, the plurality of unwinding or deflection rollers can be arranged one above the other or one behind the other, in particular vertically one above the other or one above the other in an offset manner.

In accordance with another embodiment, at least three foil- or membrane-like material webs, in particular an anode foil, a separator foil and a cathode foil, are provided. For example, at least three foils or membrane-like material webs, in particular an anode foil, a separator foil and a cathode foil, are fed. Therefore, for example, the respective blanks, which each form a layer of a battery cell, are separately prepared and consecutive magazines of the transfer apparatus are alternately populated with the blanks. In particular, the unwinding or deflection roller that conveys the separator foil conveys at a higher speed, so that a separator foil can be received in the magazine after each anode foil or cathode foil.

In accordance with a further embodiment, at least four foil- or membrane-like material webs, in particular a separator foil, an anode foil, a further separator foil and a cathode foil, are provided. For example, a battery cell is formed on the stack in this way, in particular, via a cathode or anode foil following a separator foil, a further separator foil following the cathode or anode foil and an anode or cathode foil following the further separator foil, where this process is continuously repeated. Therefore, in each case one of four of the subsequent battery cell layers is conveyed separately. Successive magazines each receive the blanks separately, so that a battery cell is formed on the stack by transferring the four blanks in succession. In particular, the respective electrode and separator foils are particularly advantageously conveyed continuously, the respective blanks are particularly advantageously received in the magazines continuously and also placed onto the stack continuously. Therefore, a particularly high manufacturing rate can be achieved.

The above-described embodiments can follow a step in which the layers formed on the stack and comprising blanks are provided to a further processing device for manufacturing a battery cell as end products of the manufacturing process or for creating a battery module that can be further manufactured from the battery cell. In a subsequent machining step, further steps for assembling battery cells are performed for example, such as insertion into the packaging and filling with electrolyte. This is followed by further steps, such as formation and aging.

It is also an object of the invention to provide a stacking system for continuously stacking blanks of at least one foil- or membrane-like material web onto a stack, having a continuous feed device, in particular an unwinding or deflection roller, for continuously feeding at least one foil- or membrane-like material web, a cutting apparatus for cutting a blank of the at least one foil- or membrane-like material web to a size dependent on the dimensions of the stack, a continuously moving transfer apparatus having a plurality of magazines for receiving the blank via one of the plurality of magazines, where the received blank can be transferred from the magazine onto the stack, before the magazine receives a subsequent blank.

Here, the unwinding or deflection roller can be a constituent part of an unwinding system comprising a plurality of rollers, in particular comprising unwinding and deflection rollers. A large number of pairs of rollers are usually involved in order to achieve as accurate guidance of the material web as possible. In addition, components which are intended to be placed onto the stack by the transfer apparatus can also be fed via devices such as grippers or, in general, robots.

For example, in the case of manufacturing fuel cells, a membrane as the material web is continuously fed, cut to size and the blanks are conveyed into the magazines. A bipolar plate is likewise fed as continuously as possible and placed, for example, alternately with the membrane or further components, into the magazines. In other embodiments, the bipolar plate can also be placed onto the stack independently of the transfer apparatus, likewise alternately with the blanks from the magazines.

Common cutters, such as transverse cutters or laser cutters, which are matched to the properties of the foil or membrane, are used as the cutting apparatus.

The stack comprises, for example, layers of the foil or membrane that have already been cut to size and receives further blanks as layers by suitable arrangement behind or below the transfer apparatus. As a result, in particular, a battery cell or a fuel cell is layered or formed on the stack. In addition to the stacked layers comprising blanks, the stack further comprises, for example, a housing which ensures that the blanks come to lie one above the other with an accurate fit.

In an embodiment, the magazines are fitted continuously on the transfer apparatus, so that a magazine for receiving a blank is available in any desired position of the moving transfer apparatus. For example, not all magazines of the transfer apparatus are used permanently. For example, adjacent magazines are not filled in a common time period. The more magazines are provided, the more easily a blank can be received from the conveying unwinding or deflection roller. In particular, damage to the foil or membrane is advantageously prevented in this way.

In particular, the blank is transported by a transfer device, such as a conveyor belt, to the transfer apparatus such that direct transfer or direct insertion into one of the magazines is possible. For example, advantageous embodiments are conceivable, in which the feeding conveyor belt is obliquely inclined, so that the blank slides into the moving magazine. For example, suitable coating of the feeding conveyor belt can result in the blank slipping down easily. For example, the receiving substrate or surface of a magazine can likewise be coated in a corresponding manner, so that it is possible for the blank to be inserted without damage. For example, movement or rotation of the transfer apparatus at a definable speed results in forces acting on the blank in such a way that it remains in one position or orientation in the magazine as far as possible and, in particular, does not slip and as a result is not, for example, bent or damaged in some other way.

In one particularly advantageous embodiment, the centrifugal forces owing to the movement of the transfer apparatus act on an approximately circular path in such a way that a blank remains on the surface of the magazine on which it was received as it is received in the magazine, i.e., before it is transferred onto the stack. For example, the centrifugal forces acting on the blank are specifically so great that the blank is held on the stack until shortly before the transfer position is reached and is detached from the surface of the magazine precisely when the transfer apparatus has reached a position in which the blank can be placed onto the stack.

Other embodiments, in which the blank is transferred during the movement of the transfer apparatus within the magazine, such as the bearing surface of the blank changes, are likewise conceivable. For example, there are two approximately opposite bearing surfaces of the magazine and the blank is situated initially on one bearing surface via one side of the blank and changes the orientation during the movement toward the stack and comes to rest on the other bearing surface by way of the other side.

The magazines of the transfer apparatus can be referred to, in particular, as compartments.

In accordance with an embodiment, the foil- or membrane-like material web is designed as a separator foil or an electrode foil for a battery cell or is designed as a membrane for a fuel cell.

In accordance with a further embodiment, the stacking system further includes a processing device for creating a battery cell from the stacked blanks. In particular, a stack filled by the transfer apparatus can be transported to the processing device by a subsequent processing step. The processing device can be designed for manufacturing a battery cell as end products of the manufacturing process or for creating a battery module which can be further manufactured from the battery cell.

In accordance with another embodiment, the stacking system includes a common cutting apparatus for the at least one foil- or membrane-like material web and/or a plurality of respective cutting apparatuses for each foil- or membrane-like material web. Therefore, depending on the condition of the individual foils or membranes, a choice can advantageously be made between methods in which the foils are placed one above the other as continuous material webs and are subsequently cut and methods in which each foil or each membrane is cut separately and the blanks are then placed one above the other.

In a further embodiment, the stacking system includes a plurality of unwinding or deflection rollers, where in each case one foil- or membrane-like material web can be continuously conveyed by one of the plurality of unwinding or deflection rollers.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained in more detail below with reference to exemplary embodiments with the aid of the figures, in which.

DETAILED DESCRIPTION OF THE EXEMPLARY EMBODIMENTS

In the figures, elements that have the same function have been provided with the same reference signs, unless stated otherwise.

Figure 1:
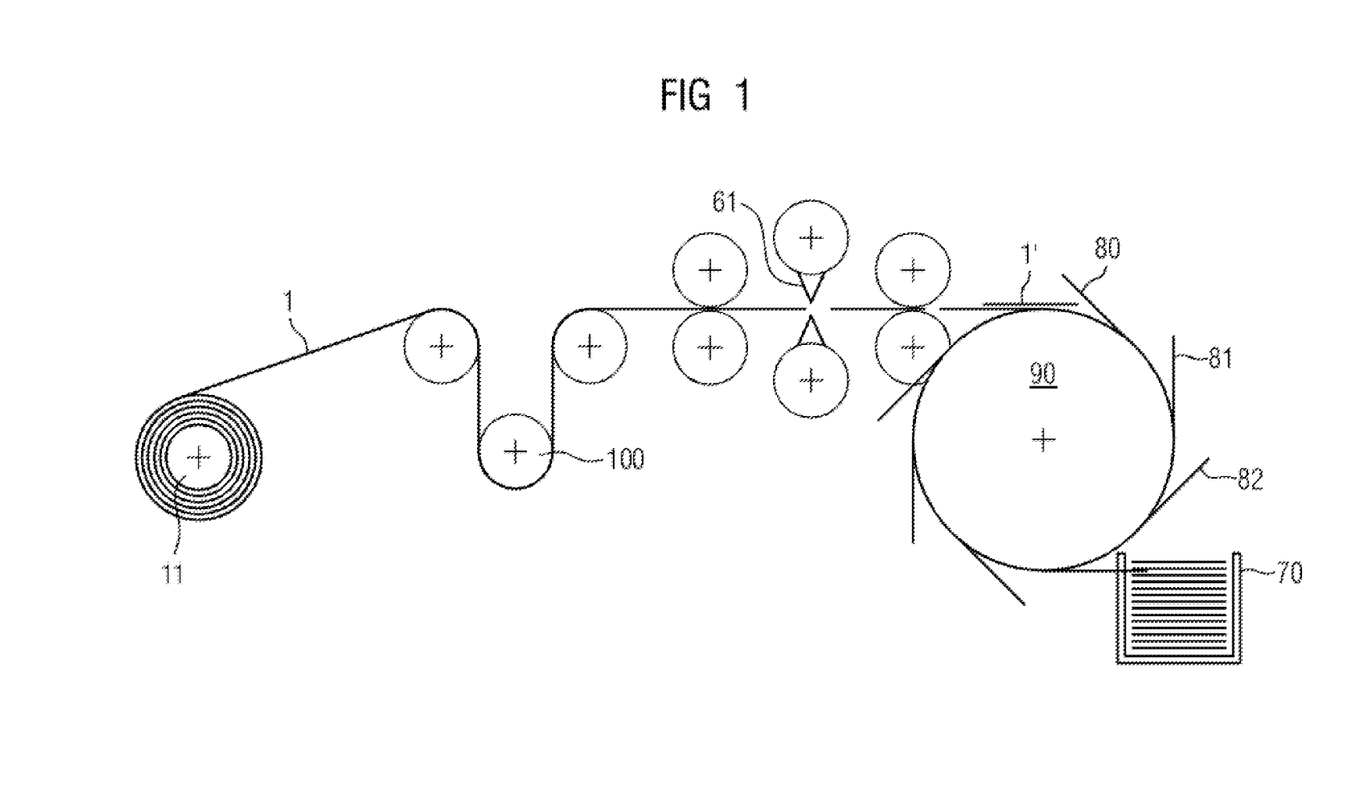
FIG. 1 shows a schematic illustration of a stacking system in accordance with a first exemplary embodiment of the invention.

FIG. 1 shows a stacking system as is used in a first exemplary embodiment of the invention. A foil 1 that can be wound and is unwound from an unwinding roller 11 is provided here. A plurality of feed and deflection rollers are used here, in particular in order to ensure uniform unwinding, for example, with a uniform tension profile in the material web. The material web 1 is fed to a cutting apparatus 61. For example, a dancer unit 100 is provided between the unwinding roller 11 and the cutting apparatus 61 in order to be able to adjust the web tension to a desired value. Blanks 1' are produced in succession by the cutting apparatus 61.

The stacking apparatus serves to allow stacking of layers of a battery cell. Foil blanks, which form the starting base for the battery cell, are applied to a stack 70 in layers for this purpose. A battery module can be formed from a plurality of battery cells in subsequent steps. The manufacturing step, in which the method for stacking and the stacking apparatus are used, follows, for example, a step of electrode manufacture in a manufacturing method for batteries and takes place, for example, before a step of insertion into packaging in the course of cell assembly.

The blank 1' is matched to the battery to be manufactured. Battery cells with prespecified dimensions are required depending on the battery to be manufactured. The stack is therefore established depending on the dimensions or type of the battery cell and the blanks 1' are matched to these dimensions. For example, square blanks are created. A single blank 1' is placed into a magazine 80 of a plurality of magazines 80, 81, 82 of a rotating transfer apparatus 90. The rotating transfer apparatus 90 is, for example, a roller which is provided with numerous magazines. The magazines 80, 81, 82 could also be called registers or compartments or insertion compartments or revolver magazines of the transfer apparatus 90.

For example, a battery cell consisting of electrode and separator layers on the stack is intended to be formed with the aid of the stacking apparatus according to the first exemplary embodiment of the invention. For this purpose, three further material webs are provided (not shown), for example, next to the material web 1 described and shown in FIG. 1, where the material webs place respective further blanks onto the stack 70 analogously via respective further unwinding rollers, respective further cutting apparatuses and respective further transfer apparatuses. For example, four transfer apparatuses are provided in a particularly advantageous embodiment, the transfer apparatuses each transferring a blank onto the common stack 70 in an alternating time sequence. For example, the four transfer apparatuses are each arranged oppositely in pairs, so that a stack is filled with blanks from four sides.

For example, two transfer apparatuses that transfer separator foil blanks onto the stack are provided opposite one another and the two further opposite transfer apparatuses respectively, convey cathode foil blanks and anode foil blanks. In particular, the four transfer apparatuses are formed in a star shape and in a symmetrical manner around the stack 70. Depending on the configuration of the hardware of the respective transfer apparatuses, it may be advantageous for this not to be formed at a uniform horizontal height, but rather for the blanks to be transferred onto the stack, for example, from a different position or height.

The further three transfer apparatuses for feeding the further three material webs have not been depicted in FIG. 1 for reasons of clarity. Embodiments in which all four stacking systems are formed in an analogous manner, in particular with respect to the deflection rollers or provided dancer systems and also the cutting apparatuses, are conceivable. Embodiments in which the provided hardware is configured differently depending on the material web to be conveyed are likewise conceivable. For example, different cutters are advantageous depending on the foil. In particular, only the two systems for transferring the separator foil are constructed in an analogous manner and differ from the other two systems.

Figure 2:
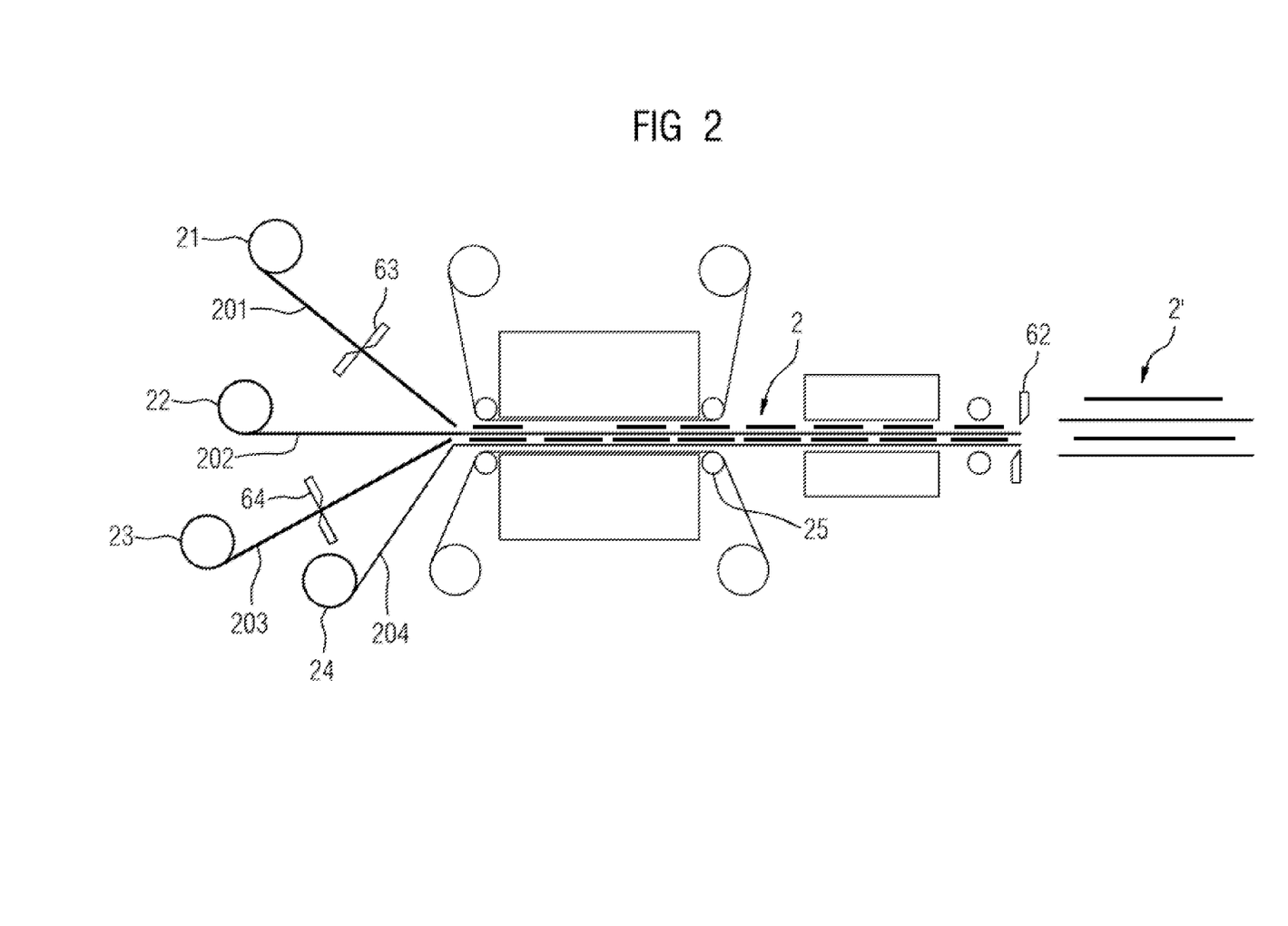
FIG. 2 shows a schematic illustration of components of a stacking system in accordance with a second exemplary embodiment of the invention.

In accordance with a second exemplary embodiment of the invention, the stacking apparatus is configured such that the material web 2, which is conveyed by a deflection roller 25, is already a layered material web consisting of four layers, in particular a separator foil layer, a cathode foil layer, a further separator foil layer and also an anode layer. The deflection roller 25 is, in particular, a pair of rollers. The material web consisting of the plurality of layers is then cut to size by a cutting apparatus 62 to form the blank 2'. In the region in front of the deflection roller 25, the system is configured such that four separate unwinding rollers 21, 22, 23, 24, which each individually unwind the four foils 201, 202, 304, are provided. Here, the two separator foils 202, 204 are fed to the deflection roller 25 without further pre-machining. In contrast, the two electrode foils 201, 203 are already cut to size here and made to lie one above the other with an accurate fit. The depicted additional cutters 63, 64 have been depicted in a highly simplified manner. In particular, it should be noted here that the electrode blanks already cut to size in advance by the cutters 63, 64 come to lie one above the other with an accurate fit or one above the other in a manner separated by the separator foil before being fed to the deflection roller 25 or enter a laminator, which is formed in the region in front of the deflection roller 25, at the same time.

Figure 3:
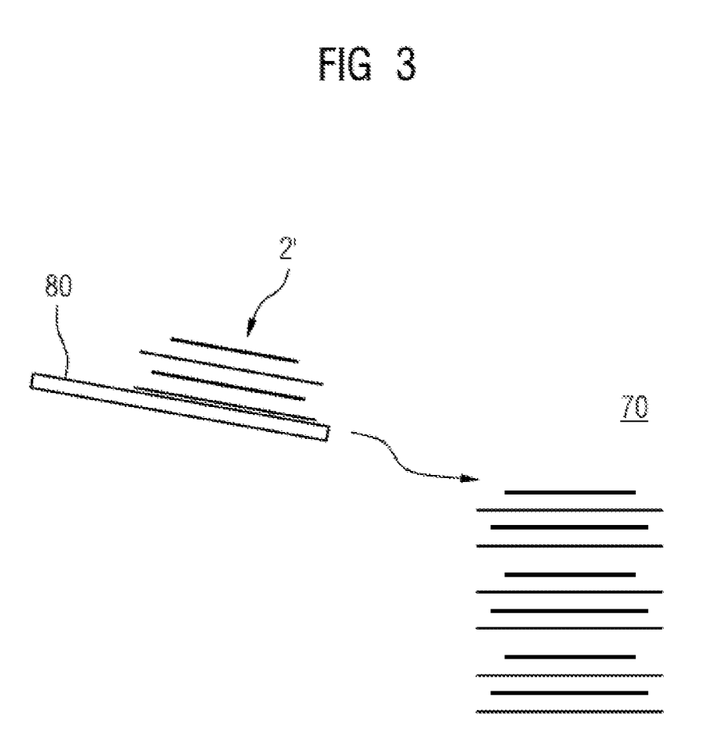
FIG. 3 shows a schematic illustration of components of the stacking system of FIG. 2.

In this regard, FIG. 3 illustrates how the blank 2' is placed on the stack 70 from one of the magazines 80 of the transfer apparatus 90. The stack 70 is therefore filled by layer packages which are supplied by the transfer apparatus 90.

Figure 4:
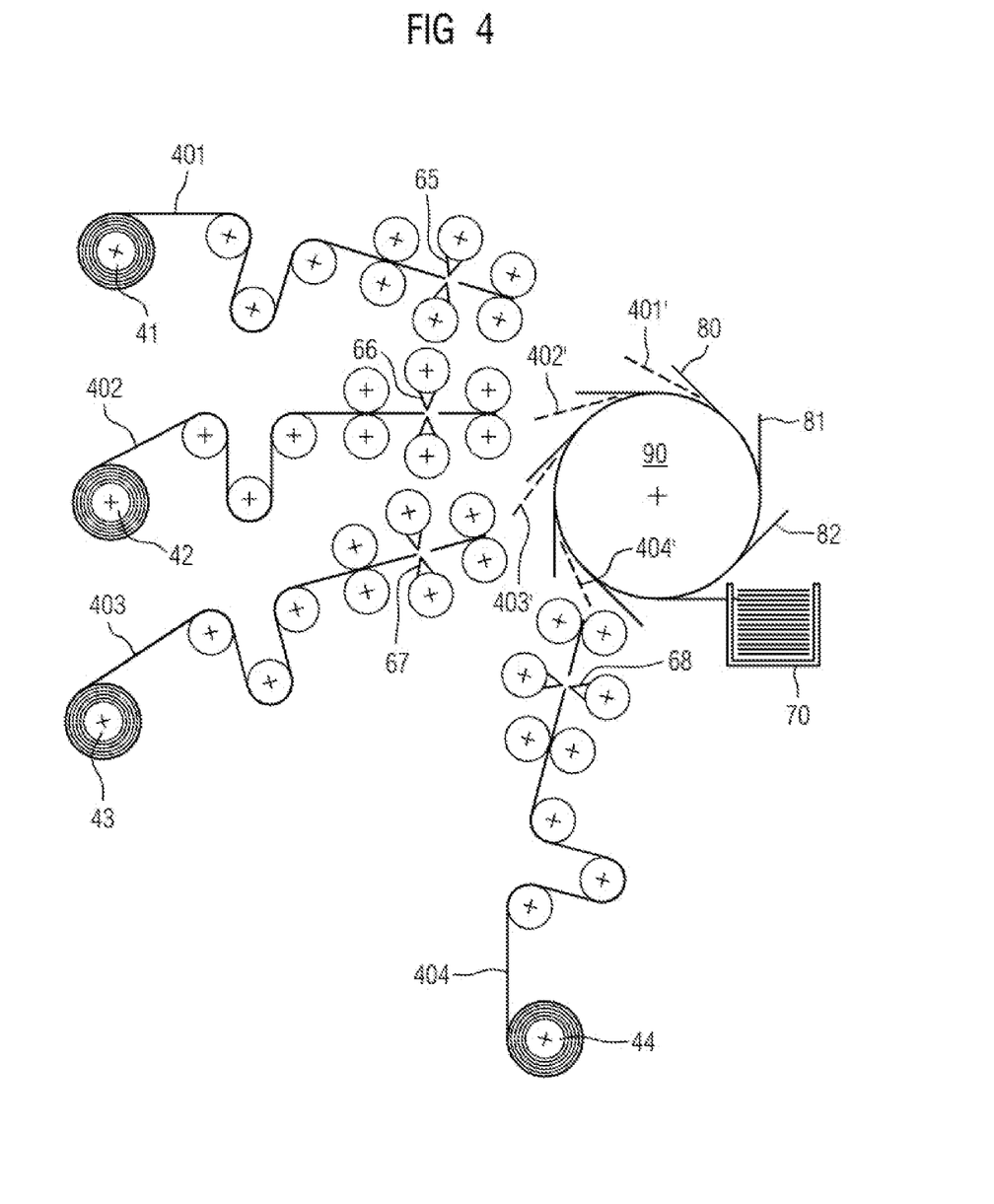
FIG. 4 shows a schematic illustration of a stacking system in accordance with a third exemplary embodiment of the invention.

In accordance with a third exemplary embodiment of the invention, magazines of the transfer apparatus 90 are alternately filled with electrode and separator blanks. In this regard, FIG. 4 shows, by way of example, one conceivable arrangement in which four unwinding rollers 41, 42, 43, 44, which each supply one of the four layers 401, 402, 403, 404 of a battery cell, are provided. For example, two webs of separator foil and two webs of electrode foil, i.e., one web of cathode foil and one web of anode foil, are provided in turn. The individual blanks 401', 402', 403', 404' are each generated separately by way of respective cutting apparatuses 65, 66, 67, 68 and inserted into separate magazines of the transfer apparatus 90. Therefore, the blanks are placed onto the stack 70 layer by layer. Embodiments with three material webs, for example, provided that the separator material can be correspondingly more rapidly unwound, are likewise conceivable. The process of receiving in the magazine has to be adjusted in terms of time for the four blanks 401', 402', 403', 404' such that adjacent filled magazines can transfer the blanks onto the stack in the appropriate order.

Figure 5:
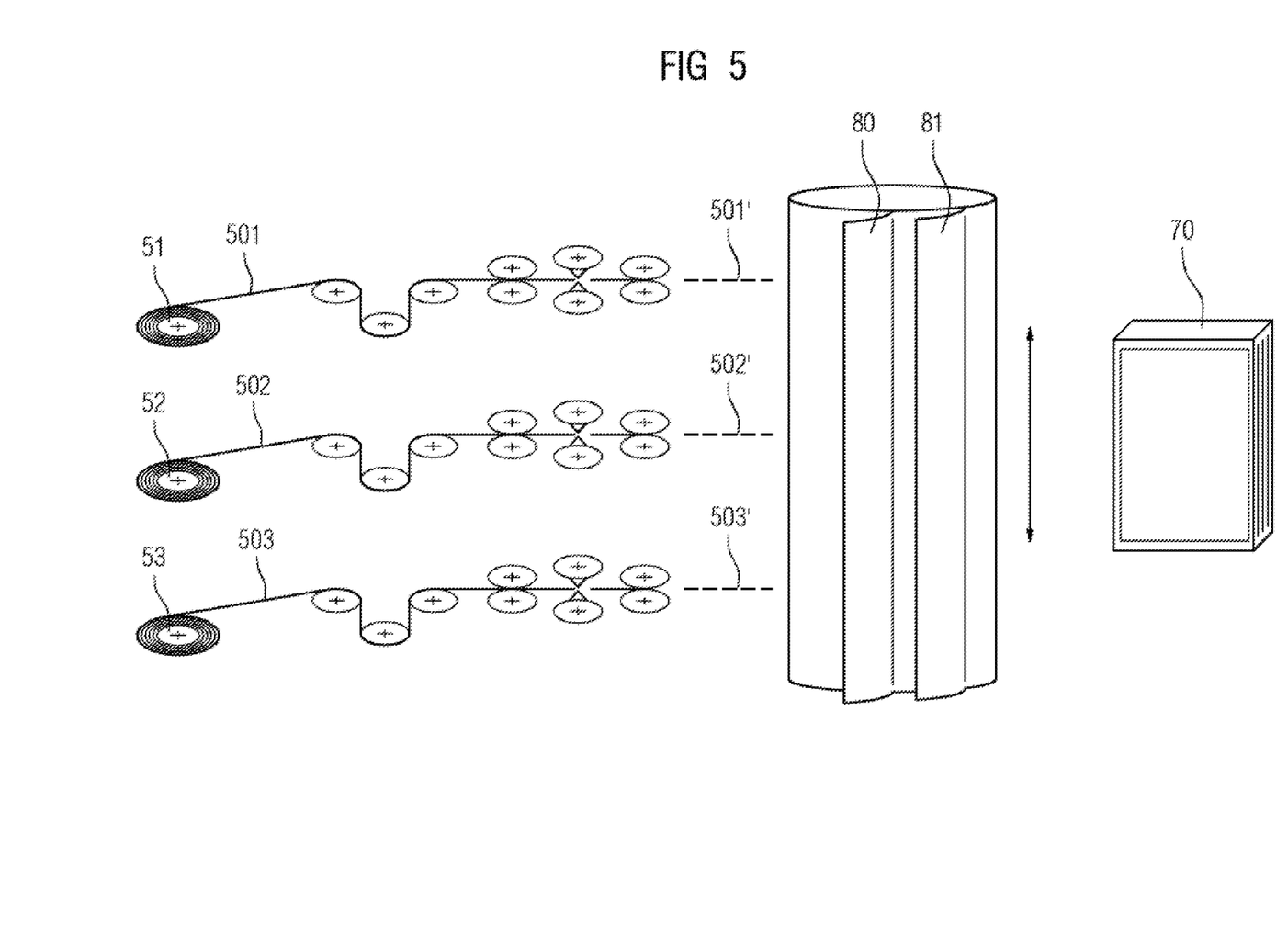
FIG. 5 shows a schematic illustration of a stacking system in accordance with a fourth exemplary embodiment of the invention.

In a fourth Embodiments, the stacking system is configured such that the blanks are received in the various magazines 80, 81 separately, but the dimensions of the transfer apparatus 90 allow the blanks 501', 502', 503' to be received in a manner offset in a direction transverse to the movement direction of the transfer apparatus 90. The feeding section of the stacking apparatus, which has the respective unwinding rollers 51, 52, 53 with the further provided components according to one of the preceding exemplary embodiments, can then advantageously be arranged approximately horizontally next to one another. For the purpose of stacking the blanks 501', 502', 503' one above the other onto the stack 70, a movement of the stack 70 likewise in the direction perpendicular to the transfer apparatus 90 can be provided for this purpose, for example. In particular, the stack 70 is moved in the direction of the rotation axis of the transfer apparatus. For example, the middle material web 502 is a separator foil which can therefore be placed onto the stack 70 between each anode foil blank and each cathode foil blank.

Figure 6:
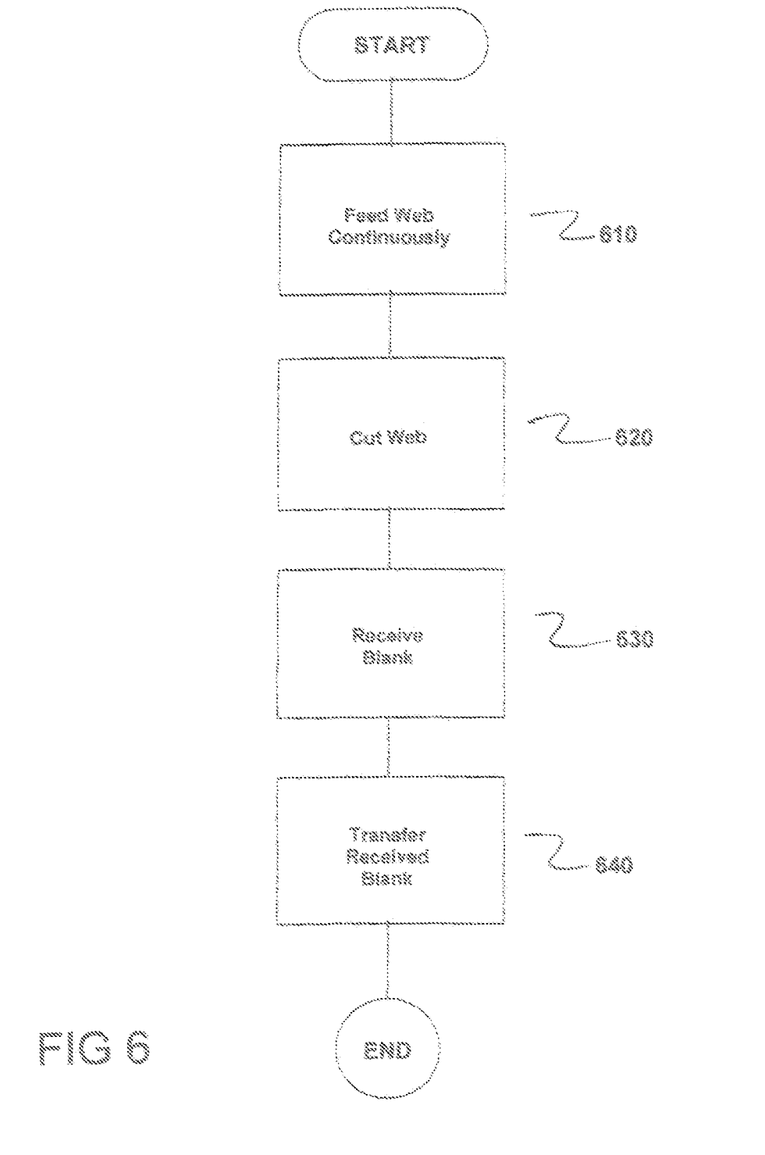
FIG. 6 is an illustration of the method in accordance with the invention.

FIG. 6 is a flowchart of the method for continuously stacking blanks of at least one foil- or membrane-like material web onto a stack 70. The method comprises continuously feeding the at least one foil- or membrane-like material web 1, 2 by at least one continuous feed device 11, 21, 22, 23, 24, 41, 42, 43, 44, as indicated in step 610.

Next, the at least one foil- or membrane-like material web 1, 2 is cut into a size dependent on dimensions of the stack 70 to form a blank 1', 2', as indicated in step 620.

Next, the blank 1', 2' is received by a magazine 80 of a continuously moving and rotating transfer apparatus 90 having a plurality of magazines 80, 81, 82, as indicated in step 630.

Next, the received blank 1', 2' is transferred from a magazine of the plurality of magazines 80 onto the stack before the magazine of the of the plurality of magazines 80 receives a subsequent blank, as indicated in step 640.

Although the invention was described and illustrated more specifically in detail by means of the exemplary embodiments, the invention is not restricted by the disclosed examples and other variations and combinations can be derived therefrom by a person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for continuously stacking blanks of at least one foil- or membrane-like material web onto a stack, the method comprising:
   continuously feeding the at least one foil- or membrane-like material web by at least one continuous feed device;
   cutting the at least one foil- or membrane-like material web into a size dependent on dimensions of the stack to form a blank;
   receiving the blank by a magazine of a continuously moving and rotating transfer apparatus having a plurality of magazines; and
   transferring the received blank from a magazine of the plurality of magazines onto the stack before the magazine of the plurality of magazines receives a subsequent blank.

2. The method as claimed in claim 1, wherein the at least one foil- or membrane-like material web is fed via an unwinding or deflection roller.

3. The method as claimed in claim 1, wherein the at least one foil- or membrane-like material web is formed as one of (i) a separator foil and (ii) an electrode foil for a battery cell.

4. The method as claimed in claim 2, wherein the at least one foil- or membrane-like material web is formed as one of (i) a separator foil and (ii) an electrode foil for a battery cell.

5. The method as claimed in claim 1, wherein the at least one foil- or membrane-like material web is formed as a membrane for a fuel cell.

6. The method as claimed in claim 2, wherein the at least one foil- or membrane-like material web is formed as a membrane for a fuel cell.

7. The method as claimed in claim 1, wherein a plurality of foil- or membrane-like material webs are fed and cut to size as a common blank.

8. The method as claimed in claim 1, wherein a plurality of common blanks cut-to-size consecutively are received in respective magazines of the transfer apparatus and are transferred to the stack consecutively.

9. The method as claimed in claim 1, wherein a plurality of foil- or membrane-like material webs are fed and are cut to size as respective separate blanks.

10. The method as claimed in claim 1, wherein respective separate blanks are received in respective magazines of the transfer apparatus and are transferred onto the stack consecutively.

11. The method as claimed in claim 1, wherein in each case one foil- or membrane-like material web is continuously conveyed by a respective one of a plurality of unwinding or deflection rollers.

12. The method as claimed in claim 1, wherein at least three foil- or membrane-like material webs are provided.

13. The method as claimed in claim 12, wherein the at least three foil- or membrane-like material webs comprise an anode foil, a separator foil and a cathode foil.

14. The method as claimed in claim 10, wherein at least four foil- or membrane-like material webs are provided.

15. The method as claimed in claim 14, wherein the at least four foil- or membrane-like material webs comprise a separator foil, an anode foil, a further separator foil and a cathode foil.

16. A stacking system for continuously stacking blanks of at least one foil- or membrane-like material web, comprising:
    at least one continuous feed device for continuously feeding at least one foil- or membrane-like material web;
    at least one cutting apparatus for cutting a blank of the at least one foil- or membrane-like material web to a size dependent on dimensions of the stack; and
    a continuously moving transfer apparatus having a plurality of magazines for receiving the blank via one of the plurality of magazines;
    wherein the received blank is transferrable from the magazine onto the stack before the magazine receives a subsequent blank.

17. The stacking system as claimed in claim 16, wherein the at least one foil- or membrane-like material web is formed as one of (i) a separator foil or an electrode foil for a battery cell and (ii) a membrane for a fuel cell.

18. The stacking system as claimed in claim 16, further comprising:
    a processing device for creating a battery cell from the stacked blanks.

19. The stacking system as claimed in claim 17, further comprising:
    a processing device for creating a battery cell from the stacked blanks.

20. The stacking system as claimed in claim 16, further comprising:
    at least one of:
    (i) a common cutting apparatus for the at least one foil- or membrane-like material web and
    (ii) a plurality of respective cutting apparatuses for each foil- or membrane-like material web.

21. The stacking system as claimed in claim 16, further comprising:
    a plurality of unwinding or deflection rollers;

wherein in each case one foil- or membrane-like material web is continuously conveyable by one unwinding or deflection roller of the plurality of unwinding or deflection rollers.

22. The stacking system as claimed in claim 16, wherein the at least one continuous feed device comprises an unwinding or deflection roller.

* * * * *